(12) United States Patent
Nelson et al.

(10) Patent No.: US 11,161,083 B2
(45) Date of Patent: Nov. 2, 2021

(54) AUTOCLAVE PLENUM

(71) Applicant: The Boeing Company, Chicago, IL (US)

(72) Inventors: Karl M. Nelson, Issaquah, WA (US); Tateh Wu, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 192 days.

(21) Appl. No.: 16/410,957

(22) Filed: May 13, 2019

(65) Prior Publication Data
US 2020/0360881 A1     Nov. 19, 2020

(51) Int. Cl.
*B01J 3/02*     (2006.01)
*B01J 3/04*     (2006.01)

(52) U.S. Cl.
CPC .. *B01J 3/02* (2013.01); *B01J 3/04* (2013.01)

(58) Field of Classification Search
CPC ...................................... B01J 3/02; B01J 3/04
See application file for complete search history.

(56) References Cited

U.S. PATENT DOCUMENTS

| | | | |
|---|---|---|---|
| 4,974,663 A | 12/1990 | Nakaji | |
| 5,180,898 A * | 1/1993 | Alden | A47J 37/044 219/388 |
| 6,872,918 B2 | 3/2005 | Toll | |
| 8,457,937 B2 | 6/2013 | Sinha et al. | |
| 9,127,888 B2 * | 9/2015 | Mason | B29C 35/0227 |
| 2008/0317647 A1 | 12/2008 | Taricco | |
| 2016/0348976 A1 | 12/2016 | Nelson et al. | |

* cited by examiner

*Primary Examiner* — Timothy C Cleveland
(74) *Attorney, Agent, or Firm* — Alleman Hall Creasman & Tuttle LLP (57) ABSTRACT

An autoclave comprises an elongate chamber enclosing an interior atmosphere, a floor configured to support one or more objects, and a plenum extending through a portion of the elongate chamber. The plenum includes an inlet as well as a plurality of outlets. The inlet is configured to receive a plenum flow of the interior atmosphere, while each of the plurality of outlets is configured to release a portion of the plenum flow to a different locus of the elongate chamber.

20 Claims, 11 Drawing Sheets

AUTOCLAVE PLENUM

TECHNICAL FIELD

This disclosure relates generally to autoclaves, and more specifically to airflow in autoclaves.

BACKGROUND

An autoclave may be used to process various objects, such as articles of manufacture, by subjecting the objects to controlled temperature and/or pressure. Typically, there should be efficient convective heat transfer between the temperature-controlled interior atmosphere of the autoclave and the objects to be processed therein. To that end, some autoclaves include numerous active-convection components, such as blowers and circulators, which enhance the flow around the objects and thereby increase the heat-transfer efficiency. However, for an autoclave of fixed chamber size, such componentry necessarily restricts the length, width, and/or height of the objects that may be processed therein. Furthermore, in autoclaves having a great complexity of blowers and circulators, there may be additional installation and maintenance costs, and a need for sophisticated control and fail-safe componentry.

SUMMARY

One aspect of this disclosure relates to an autoclave comprising an elongate chamber enclosing an interior atmosphere, a floor configured to support one or more objects, and a plenum extending through a portion of the elongate chamber. The plenum includes an inlet as well as a plurality of outlets. The inlet is configured to receive a plenum flow of the interior atmosphere, while each of the plurality of outlets is configured to release a portion of the plenum flow to a different locus of the elongate chamber.

Another aspect of this disclosure relates to a method for improving heat transfer in an autoclave. The method comprises receiving a plenum flow of an interior atmosphere of a chamber of the autoclave through an inlet of a plenum and releasing a portion of the plenum flow from each of a plurality of outlets of the plenum to a different locus of the chamber.

Another aspect of this disclosure relates to a plenum extending through a portion of a chamber of an autoclave, where the chamber encloses an interior atmosphere. The plenum includes an inlet as well as a plurality of outlets. The inlet is configured to receive a plenum flow of the interior atmosphere, while each of the plurality of outlets is configured to release a portion of the plenum flow to a different locus of the chamber.

This Summary is provided in order to introduce a portion of this disclosure in simplified form, not to identify key or essential features. The Claims appended to this disclosure set forth the claimed subject matter, which is limited neither to the content of this Summary nor to implementations that address any problems or disadvantages noted herein. Any features, functions, or advantages that have been discussed can be achieved independently in various embodiments or may be combined in yet other embodiments, further details of which can be seen with reference to the following description and drawings.

BRIEF DESCRIPTION OF THE DRAWINGS

This disclosure will be better understood from reading the following Detailed Description with reference to the attached drawing figures, wherein.

DETAILED DESCRIPTION

Aircraft are made using lightweight materials in order to optimize performance and fuel economy. For some aircraft, such lightweight materials include fiber-composite materials, in which strong, lightweight fibers are immobilized in a cured resin matrix. Typically, an aircraft part may be formed from a fiber-composite material with the resin in an uncured or partially cured state. The formed part is then subjected to elevated temperature for a predetermined period of time, in order to complete the cure. To improve the strength and reliability of fiber-composite aircraft parts, as well as to optimize manufacturing efficiency, it is desirable to cure relatively large parts after assembly, as opposed to curing many smaller parts separately, and then assembling. Accordingly, a temperature-controlled heating chamber of significant size is required for the curing process. In the technical field of this disclosure, the term 'autoclave' refers to such a chamber.

As described in further detail herein, the heat-transfer efficiency of an autoclave can be improved by addition of a suitably configured plenum. The plenum increases convection in the working chamber of the autoclave by ejecting air from a series of outlets arranged along the length of the chamber. Air from the plenum may be ejected into the main flow through the chamber, to induce a swirling flow that promotes efficient heat transfer to objects within the chamber. The plenum can be configured to occupy a minimum of space within the chamber, so that large objects can be accommodated therein. Moreover, the plenum can be entirely passive, requiring little additional investment in autoclave control and maintenance. In some examples, a plenum may be provided in the form of a kit that may be used to retrofit an existing autoclave to improve heat-transfer efficiency therein.

This disclosure will now be presented by way of example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Figure 1:
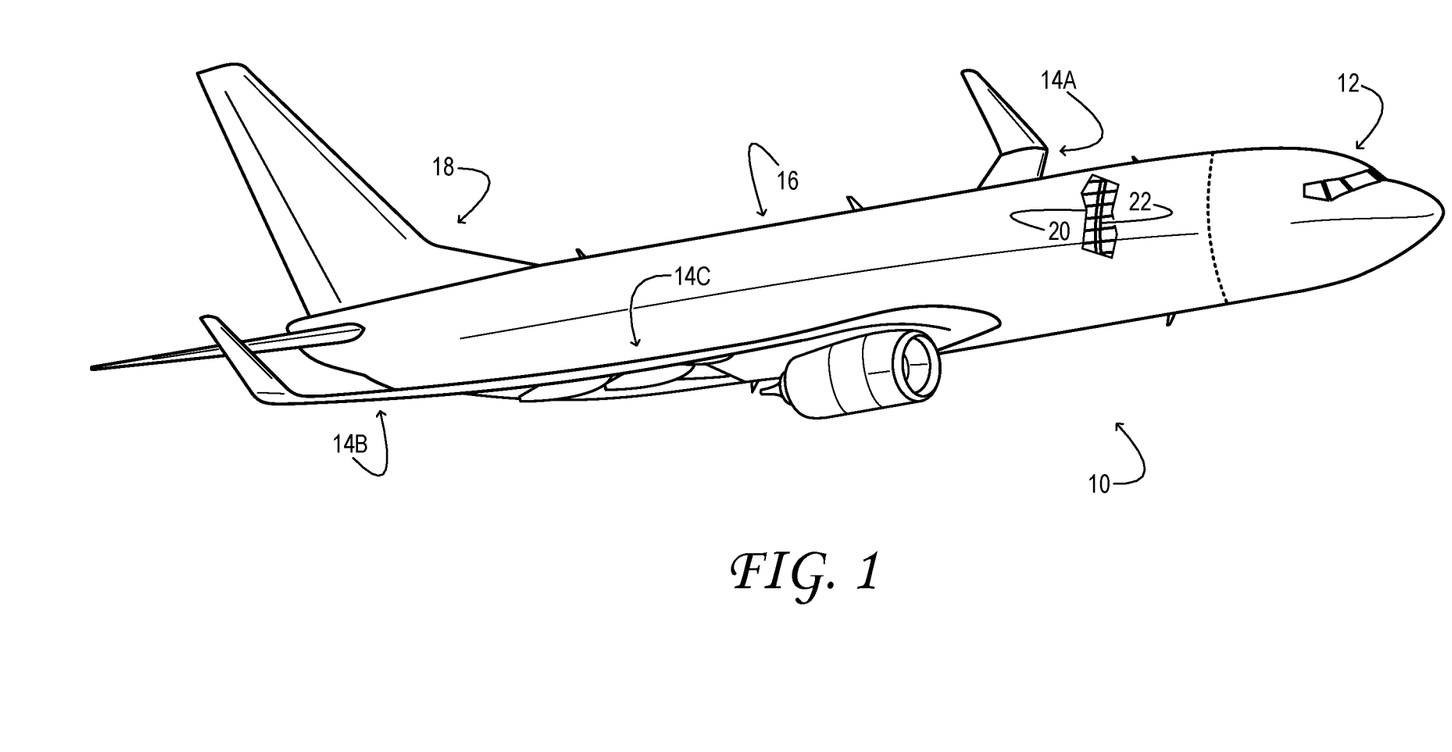
FIG. 1 shows aspects of an example aircraft.

FIG. 1 shows aspects of an example aircraft 10. The aircraft includes, inter alia, a nose section 12, wing sections 14A through 14C, a fuselage section 16, and a tail section 18. Any or all of these aircraft sections may include a lightweight, fiber-composite skin 20. Any or all of these aircraft sections may include a stiffener member 22, such as a stringer, spar, and/or longeron. A stiffener member may be arranged beneath the skin, to increase the rigidity of the skin. In some examples, at least some of the stiffener members may include a fiber-composite material.

The compositions of the fiber-composite materials envisaged herein are not particularly limited. Example fiber-composite materials may include carbon fibers immobilized in a cured polymer resin. The polymer resin may include one or more of an epoxy-amine resin, a urethane resin, or an acrylamide resin, for example. Such polymer resins, among others, are heat-curable in air within temperature ranges accessible in a suitably configured autoclave, as described further below.

Aircraft 10 of FIG. 1 has a wingspan of 35.9 meters and a length of 35.6 meters from nose to tail. Accordingly, the various sections of the aircraft enumerated above are commensurately large. It is advantageous to cure relatively large portions of the aircraft in a pre-assembled state, to secure desired material properties and manufacturing efficiency. For instance, it may be advantageous to cure the entire nose section 12 of aircraft 10 in one piece. It may be advantageous to concurrently cure additional aircraft parts, such as one or more stiffener members 22, even while the nose section is being cured. Accordingly, the autoclave used to cure the aircraft parts can be commensurately large.

Figures 2A, 2B:
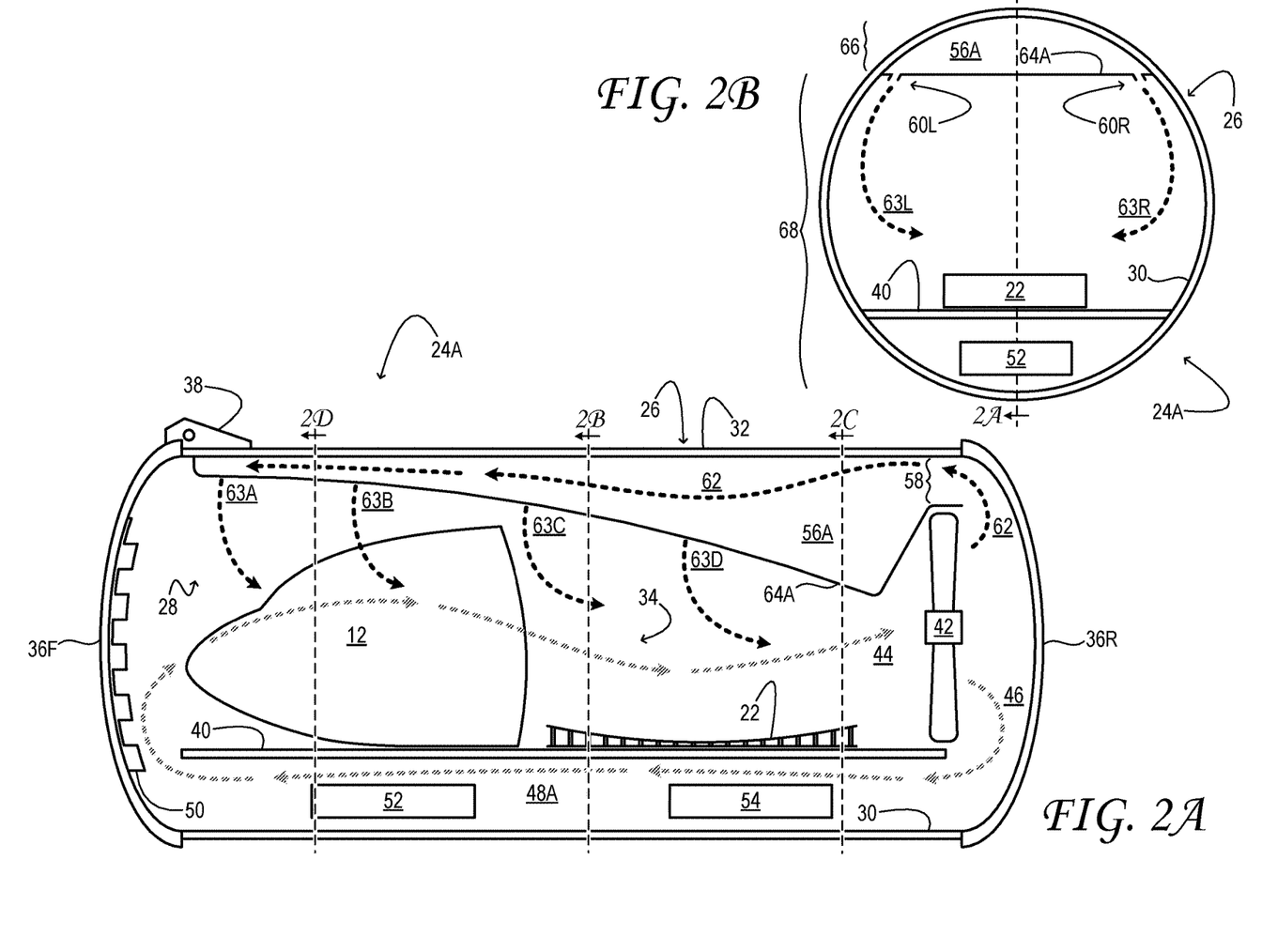
FIGS. 2A through 2D show aspects of an example autoclave in cross section.
Figure 2C:
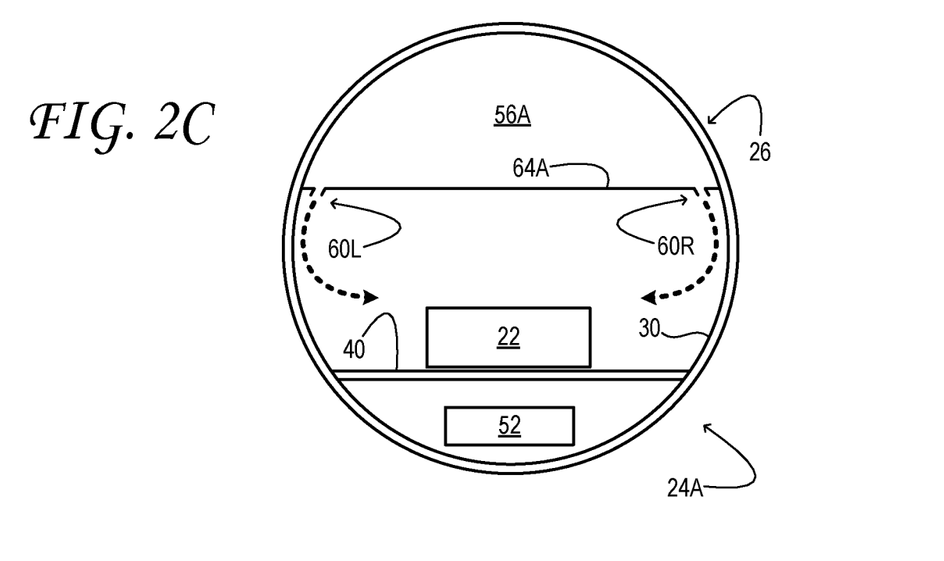
Figure 2D:
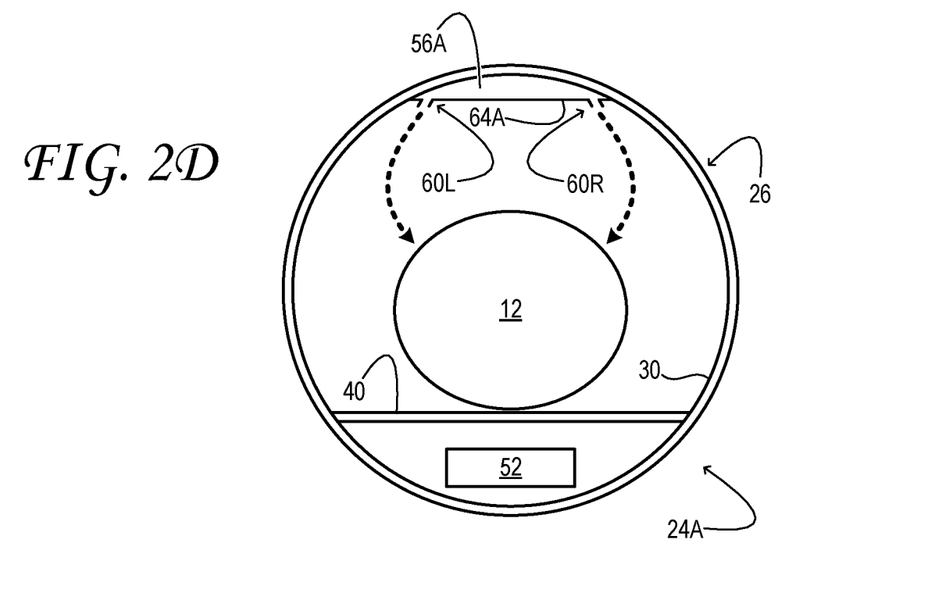
Figure 3A:
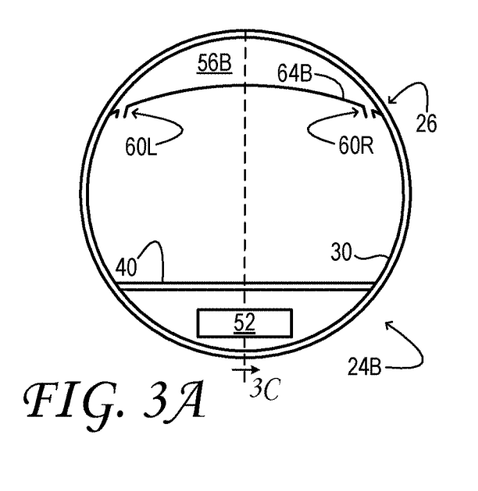
FIGS. 3A through 3D show aspects of another example autoclave in cross section.
Figure 3B:
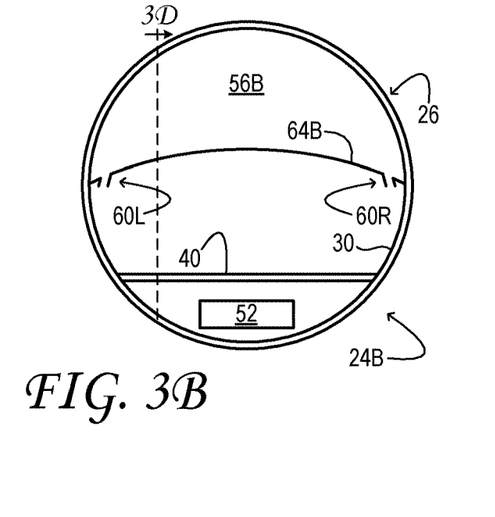
Figure 3C:
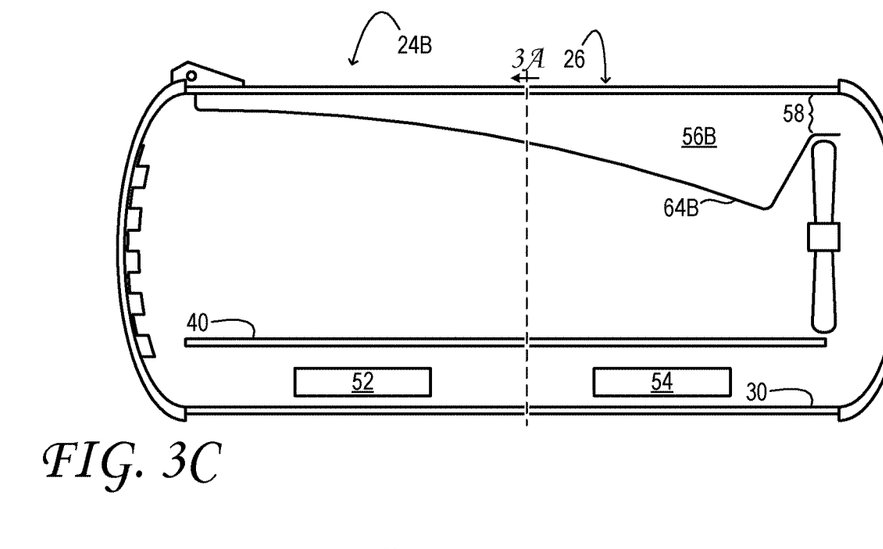
Figure 3D:
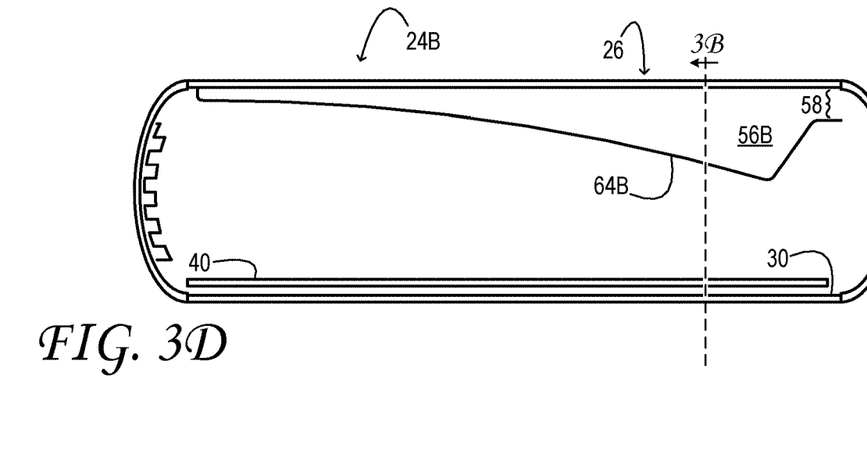

FIGS. 2A through 2D show aspects of an example autoclave 24A in cross section. FIG. 2A shows a longitudinal cross section, while FIGS. 2B through 2D show perpendicular cross sections in the cutting planes indicated in FIG. 2A.

Starting in FIG. 2A, autoclave 24A includes an elongate chamber 26 enclosing an interior atmosphere 28. In the illustrated example, the chamber has an interior wall 30 and an exterior wall 32. Any suitable materials may be used for the interior and exterior walls. The walls may comprise steel, for example. In some examples, the interior wall may comprise a corrosion-resistant (e.g., stainless) steel. A high polish may be applied to at least the interior wall to facilitate cleaning. Thermal insulation may be disposed between the interior and exterior walls to limit the exchange of heat between the chamber and its surroundings. Chamber 26 of FIGS. 2A and 2B is substantially cylindrical as illustrated, with a diameter of 7 meters and a length of 20 meters. Accordingly, the chamber is large enough to accommodate the entire nose section 12 of aircraft 10 and long enough to concurrently accommodate additional aircraft parts, such as stiffener member 22. Although adequate chamber size is important for any autoclave implementation, the particular shapes and dimensions recited herein are provided by way of example. Larger, smaller, and non-cylindrical chambers are equally envisaged.

Furthermore, despite repeated reference to aircraft parts, aircraft sections, and the curing of fiber-composite materials, the autoclaves disclosed herein may provide more generalized utility. A suitably configured autoclave 24 may be used to subject any physical object 34, or plurality of physical objects 34, to controlled temperature and/or pressure. Further still, while the internal atmosphere 28 in chamber 26 of the autoclave may comprise air (e.g., for curing typical polymer resins), modified and/or alternative atmospheres are also envisaged. Examples include pressurized air, humidified air, de-humidified air, oxygen-enriched or oxygen-depleted air, ozone-enriched air, nitrogen, and carbon dioxide. Such temperature- and/or pressure-controlled atmospheres may support various forms of article processing in addition to resin curing. Examples include powder coating, cleaning, sterilization, controlled oxidation, and other forms of surface modification.

Returning now to FIG. 2A, autoclave 24A includes a forward end cap 36F and a rear end cap 36R arranged at opposite ends of chamber 26. One or both of the forward and rear end caps may be configured as a door or hatch, to enable access to the chamber and insertion and removal of objects 34. Accordingly, autoclave 24A includes, in the illustrated example, a hinge 38 arranged at the junction of chamber 26 and forward end cap 36F. The hinge is configured to pivotally couple the forward end cap to the chamber. The autoclave also may include a flexible O-ring seal (not shown in the drawings), arranged between the forward end cap and the chamber to maintain the internal atmosphere 28 of the chamber when the autoclave is in operation. The forward and rear end caps may comprise any suitable material—e.g., steel, as noted above.

Autoclave 24A includes a floor 40 arranged in chamber 26 and configured to support the objects 34 to be processed therein. As shown in FIG. 2B, the floor is aligned to a horizontal secant plane of the cylinder to which the elongate chamber conforms. In other words, the floor intersects interior wall 30 of the chamber at two opposing, horizontal edges. Further, as shown in FIG. 2A, the floor is continuous, extending along the chamber from within a narrow clearance of forward end cap 36F to within a narrow clearance of rear end cap 36R. In other examples, there may be a clearance between the floor and the interior wall. In other examples, two or more discontinuous floors may be arranged in the chamber.

In some examples, floor 40 may be perforated and/or corrugated so as to allow a substantial flow of interior atmosphere 28 therethrough. In the example of FIGS. 2A and 2B, however, the floor is solid and serves to partition the internal atmosphere around and above objects 34 from the internal atmosphere below the objects. In this example, the autoclave includes a fluidic element in the form of impeller 42 arranged in chamber 26. The type of impeller used in autoclave 24A is not particularly limited. Example impellers include fans, blowers, circulators, pumps, and ejectors. The impeller induces a flow of the internal atmosphere over, around, and/or through objects 34. More specifically, the impeller is configured to receive an inflow 44 of the internal atmosphere from downstream of the objects and to discharge a chamber flow 46. The chamber flow discharged by the impeller changes direction at rear end cap 36R and flows into subfloor conduit 48A, which is arranged below the floor. Chamber flow 46 is conducted through the subfloor conduit to forward end cap 36F and again changes direction, now flowing above the floor and toward objects 34. In the illustrated example, a fluid diffuser 50 is arranged on the interior surface of the forward end cap. The fluid diffuser may be configured to quell any spurious, high-velocity subflow of chamber flow 46 that otherwise might adversely affect object processing. In some examples, the fluid diffuser may have an egg-crate configuration. In some examples, the fluid diffuser may be omitted.

Autoclave 24A includes a heater 52 and a cooler 54, each arranged in subfloor conduit 48A and configured to control the temperature of chamber flow 46. The type of heater and/or cooler used in autoclave 24A is not particularly limited. Example heaters include electric heaters and heat exchangers configured to receive fluidic heat flow from outside of chamber 26. The cooler, if installed, may include a heat exchanger configured to receive fluidic coolant flow. The heater and/or cooler may be coupled operatively to a process controller (e.g., a proportional-integral-derivative (PID) controller that receives input from one or more temperature and/or pressure sensors arranged in chamber 26 or on objects 34. In this manner, the heater and/or cooler may be configured for closed-loop control of the temperature of flowing internal atmosphere 28.

For curing fiber-composite aircraft parts, autoclave 24A may be operated within at least two different temperature ranges: 250 to 270° F., and 345 to 365° F. In some examples, the internal pressure in chamber 26 of the autoclave may be maintained at 45±10 psig or 85 to 100 psig. Various other temperature and pressure ranges are envisaged as well. In some examples, the heating rate of internal atmosphere 28 may range from 0.1 to 5.0° F./minute. In some examples, the heating rate may be decreased as the cure cycle transitions to a dwell or hold temperature. At these slower heating rates especially, improved heat transfer may significantly reduce the overall cure-cycle time. In some examples, the cooling rate may range from 1.0 to 5.0° F./minute. It will be understood, however, that various other heating and cooling rates are also envisaged, both for the curing of fiber-composite aircraft parts and for other applications.

Returning now to FIG. 2A, impeller 42 may be configured to impart a significant flow rate to chamber flow 46, such that the temperature gradient of internal atmosphere 28 is small (e.g., ±10° C., ±2° C.) along every path within chamber 26. In particular, the difference in the temperature of chamber flow 46 in the forward versus the rear end of the chamber may be limited to a small value. Nevertheless, in addition to accurate control of the temperature of chamber flow 46, efficient (i.e., rapid) heat transfer between the flowing internal atmosphere 28 and objects 34 is typically desired. Efficient heat transfer allows objects 34 to promptly attain the predetermined working temperature of the process conducted in the autoclave. This reduces the overall residence time for the objects to be processed, which reduces manufacturing costs. In addition, efficient heat transfer from controlled-temperature chamber flow 46 reduces the temperature gradient over each object to be cured. In the particular example of resin curing, efficient heat transfer reduces the differential curing rate between 'hot spots' that cure faster than the average rate, and 'cold spots' that cure slower than the average rate. By providing efficient heat transfer to all objects within chamber 26, a scenario is avoided in which objects in the chamber must be heated for an excessively long time, or heated to excessive temperature, in order to ensure that each of the cold spots is adequately cured. In some examples, excessive heating may degrade the desirable material properties of a composite material, such as strength and flexibility, due to inhomogeneous curing conditions (especially in the hot spots).

Generally speaking, heat transfer in an autoclave is a convective effect: the heat transfer coefficient is greater in areas that receive greater convection and lower in areas that receive less convection. In the application illustrated in FIGS. 2A and 2B, stiffener member 22 is arranged fluidically downstream of the very large nose section 12. Arranged in this manner, the stiffener member is in a convective 'shadow' of the nose section and thus might not receive adequate convection for efficient heat transfer if the flow in the autoclave is not further controlled.

One solution to this problem is to install numerous active-convection components in the autoclave chamber, such as blowers and circulators, which enhance the flow around the objects to be processed and thereby increase the heat transfer efficiency. However, for an autoclave of fixed chamber size, such componentry installed in the chamber would restrict the length, width, or height of the objects to be processed therein. Furthermore, in autoclaves having a great complexity of blowers and circulators, there may be additional installation and maintenance costs, and a need for sophisticated control componentry, fail-safes, etc. Another solution is to incorporate baffles that provide a turbulent downward crossflow toward the objects to be processed. Although effective, the baffle solution may also limit the size of the objects that can be processed in the autoclave.

To address these issues and secure other advantages, autoclave 24A includes a plenum 56A extending through a portion of elongate chamber 26. In some examples, the portion of the chamber through which the plenum extends may include more than half of the length of the chamber—e.g., 60 to 80% the length of the chamber. In other examples, the plenum may be longer or shorter relative to the chamber. The plenum includes an inlet 58 and a plurality of outlets 60. In the example of FIG. 2A, the inlet of the plenum is configured to receive a plenum flow 62 of interior atmosphere 28 from impeller 42. The impeller impels and separates inflow 44 into plenum flow 62 and non-plenum chamber flow 46 and conducts the plenum flow into the inlet of the plenum. In this manner, both the plenum flow and the non-plenum chamber flow may be separated from the throughflow of the impeller. In some examples, a plenum may have more than one inlet configured to receive the plenum flow.

In some examples, the flow volume of plenum flow 62 and non-plenum chamber flow 46 may be roughly equal, such that internal atmosphere 28 is admitted to plenum 56A and to subfloor conduit 48A at the same volumetric flow rate. In other examples, the respective flow rates of the plenum flow and the non-plenum chamber flow may be significantly unequal. In some examples, the volumetric flow rate of the plenum flow may be one-half or less of the volumetric flow rate of the non-plenum chamber flow. In some examples, 30% of the throughflow of the impeller or other flow-separating fluidic element may be directed into the inlet of the plenum, and the remaining 70% of the throughflow may be directed to the subfloor or other non-plenum conduit.

Each of the plurality of outlets 60 of plenum 56A is configured to release a portion of plenum flow 62 to a different locus of chamber 26. This aspect is illustrated in FIG. 2A by the series of release flows directed away from plenum 56A and into non-plenum chamber flow 46. In the example of FIG. 2A, release flows 63A and 63B are released from the portion of the plenum above nose section 12; release flows 63C and 63D are released from the portion of the plenum above stiffener member 22. FIG. 2B shows right and left release flows 63R and 63L. As described further below, the plenum may be positioned and configured (with respect to its size and shape and the position and configuration of the outlets) to release a portion of the plenum flow to any desired locus of the chamber, and in any desired direction. In some examples, one or more of the outlets may be configured to release corresponding portions of the plenum flow into a rotating current in interior atmosphere 28.

As shown in FIG. 2B, boundary surface 64A of plenum 56A separates plenum volume 66 from non-plenum chamber volume 68. The boundary surface may comprise a relatively thin, lightweight sheet metal (e.g., steel), although any suitable material may be used. In the illustrated examples, a single boundary surface 64A, together with interior wall 30 of chamber 26, defines the shape and volume of plenum 56A. In other examples, however, a plenum may include additional boundary surfaces—e.g., a surface opposite boundary surface 64A and adjacent to interior wall 30.

Plena of various shapes and sizes are envisaged herein. In one approach, a fluid-dynamics simulation may be used in order to determine the appropriate size, shape, and/or outlet locations and configurations of a plenum appropriate for processing a given set or range of objects in an autoclave of given dimensions. In the example of FIG. 2A, boundary surface 64A of plenum 56A is curved along the length of chamber 26. As such, the cross-sectional area of the plenum varies along the length of the chamber. In particular, the cross-sectional area decreases with increasing distance from inlet 58. This configuration helps to maintain the velocity of the discharge from outlets 60 at increasing distance from the inlet (after an increasing amount of plenum flow 62 has already been discharged). In other examples, however, the cross-sectional area may be substantially constant, or may remain constant over one or more segments of the plenum or may vary in the opposite direction. In examples in which objects of predetermined dimensions are to be processed at predetermined locations in the chamber, the position, configuration, and/or orientation of at least some of the outlets may be such as to release a portion of the plenum flow into a narrow gap between an object and an autoclave or plenum surface, for increased flow velocity in that area.

In some examples, boundary surface 64A may be a continuously curved sheet, such that the cross section of plenum 56A in each plane normal to the longitudinal axis of chamber 26 is of similar shape but varying size, as shown in FIGS. 2B through 2D.

In other examples, the boundary surface may be constructed from a formed sheet, which may be curved along two or more directions. This variant is shown by example in the cross-sectional view of autoclave 24B of FIGS. 3A through 3D, wherein boundary surface 64B is curved in a direction perpendicular to the longitudinal axis of chamber 26. The additional curvature of the boundary surface may enable taller objects 34 to be accommodated in the chamber. In still other examples, the cross-sectional shape of the plenum may vary along the length of the chamber so as to provide the desired compromise between fittability of objects in the chamber and efficient heat transfer to the objects.

Figure 4:
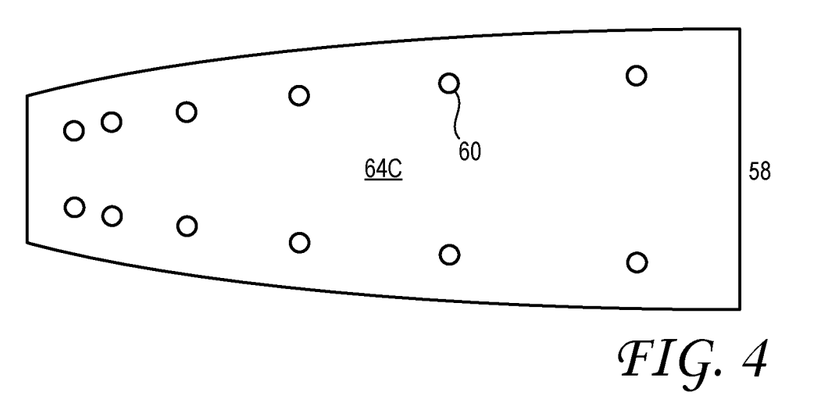
FIGS. 4 and 5 show aspects of example boundary surfaces of plena of example autoclaves.

In these and other examples, outlets 60 of the plenum are distributed along the length of chamber 26. In some examples, the outlets may be distributed at constant linear density on boundary surface 64 of the plenum (e.g., four outlets per linear meter). In other examples, the outlets may be distributed at varying density on the boundary surface of the plenum. On example boundary surface 64C of FIG. 4, the linear density of the outlets varies along the length of the chamber. In particular, the linear density increases with increasing distance from inlet 58 of the plenum. The increasing linear density of the outlets may provide a more uniform rate of discharge of plenum flow 62 along the length of the plenum—compensating in whole or in part for the gradual loss of plenum flow along the length of the plenum.

Figure 5:
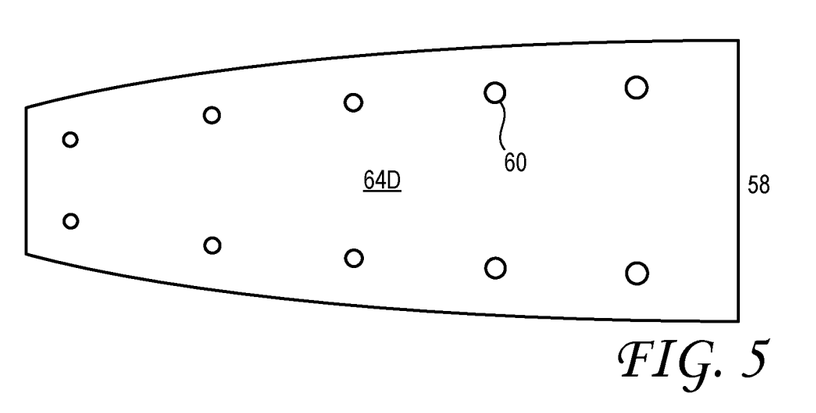

In some examples, each of the outlets 60 of plenum 56A, etc., may have the same size. In other examples, at least some of the outlets may have variable size. On example boundary surface 64D of FIG. 5, the size of the outlets varies along the length of the chamber. In particular, the size decreases with increasing distance from inlet 58 of the plenum. The decreasing size of the outlets may provide a more uniform flow velocity from each outlet—compensating in whole or in part for the gradual loss of plenum flow along the length of the plenum. In other examples, the size may increase with increasing distance from the inlet, in order to provide a more uniform rate of discharge of plenum flow 62 along the length of the plenum.

In some examples, the size of each outlet 60 may be fixed. In other examples, the size of one or more of the outlets may be mechanically adjustable—e.g., via a louver or iris. In some examples, the outlet size may be adjustable remotely via an electromechanical mechanism. In some examples, the outlet size may be adjustable in real time during the processing of objects 34.

In some examples, each outlet 60 may have a fixed orientation that determines the direction of the outflow from the outlet. An outlet may be directed downward toward floor 40, for instance, such that the outflow from that outlet is also directed toward the floor. Naturally, the orientation of a given outlet is a function of the position of the opening of that outlet on a boundary surface 64. In examples in which the outlet includes a guide surface (e.g., louver or tube) in addition to the opening, the direction of the outflow may be a function of the alignment of the guide surface as well. For example, the outflow may be parallel to the guide surface or biased toward a direction parallel to the guide surface. In some examples, at least some of the outlets may have a variable orientation. In application scenarios, the orientation may be varied in dependence on the dimensions of objects 34, so as to provide the desired flow to the objects.

Figure 6:
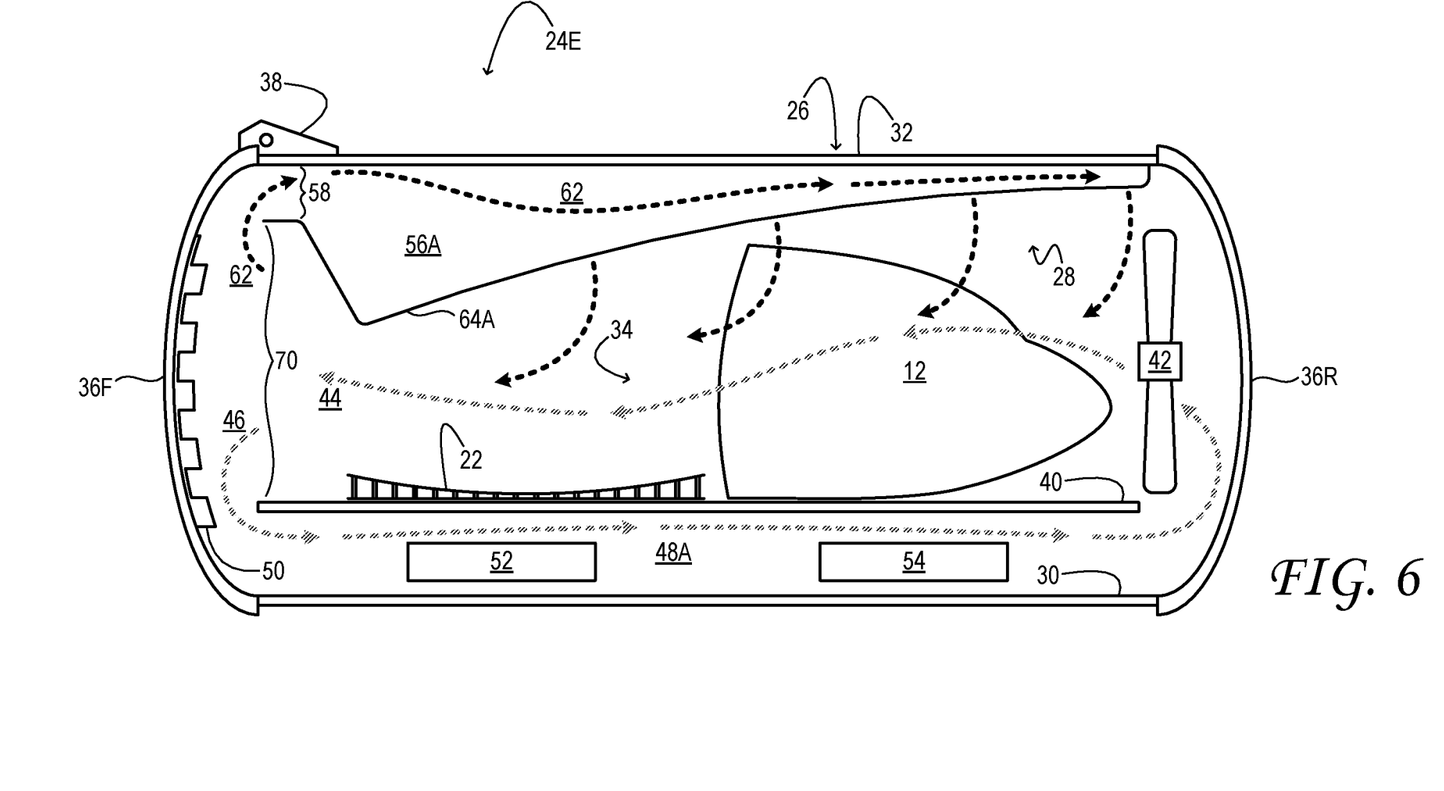
FIGS. 6, 7, 8A, 8B, 9A, and 9B show aspects of other example autoclaves in cross section.

FIG. 6 shows aspects of another example autoclave 24E, in which impeller 42 is arranged at the forward end of chamber 26, fluidically upstream of objects 34. In this example, the impeller is oriented such as to induce a flow of internal atmosphere 28 toward the objects. In autoclave 24E, the fluidic element configured to receive inflow 44 from downstream of the objects takes the form of passive fluid diverter 70. Here inlet 58 of plenum 56A is configured to receive plenum flow 62 from the passive fluid diverter. Arranged at the rear end of the elongate chamber, the passive fluid diverter separates the inflow it receives into plenum flow 62 and non-plenum chamber flow 46. The portion of the throughflow of the passive fluid diverter corresponding to the non-plenum chamber flow is conducted into subfloor conduit 48A, while the portion of the throughflow corresponding to the plenum flow is conducted into the inlet of the plenum.

Figure 7:
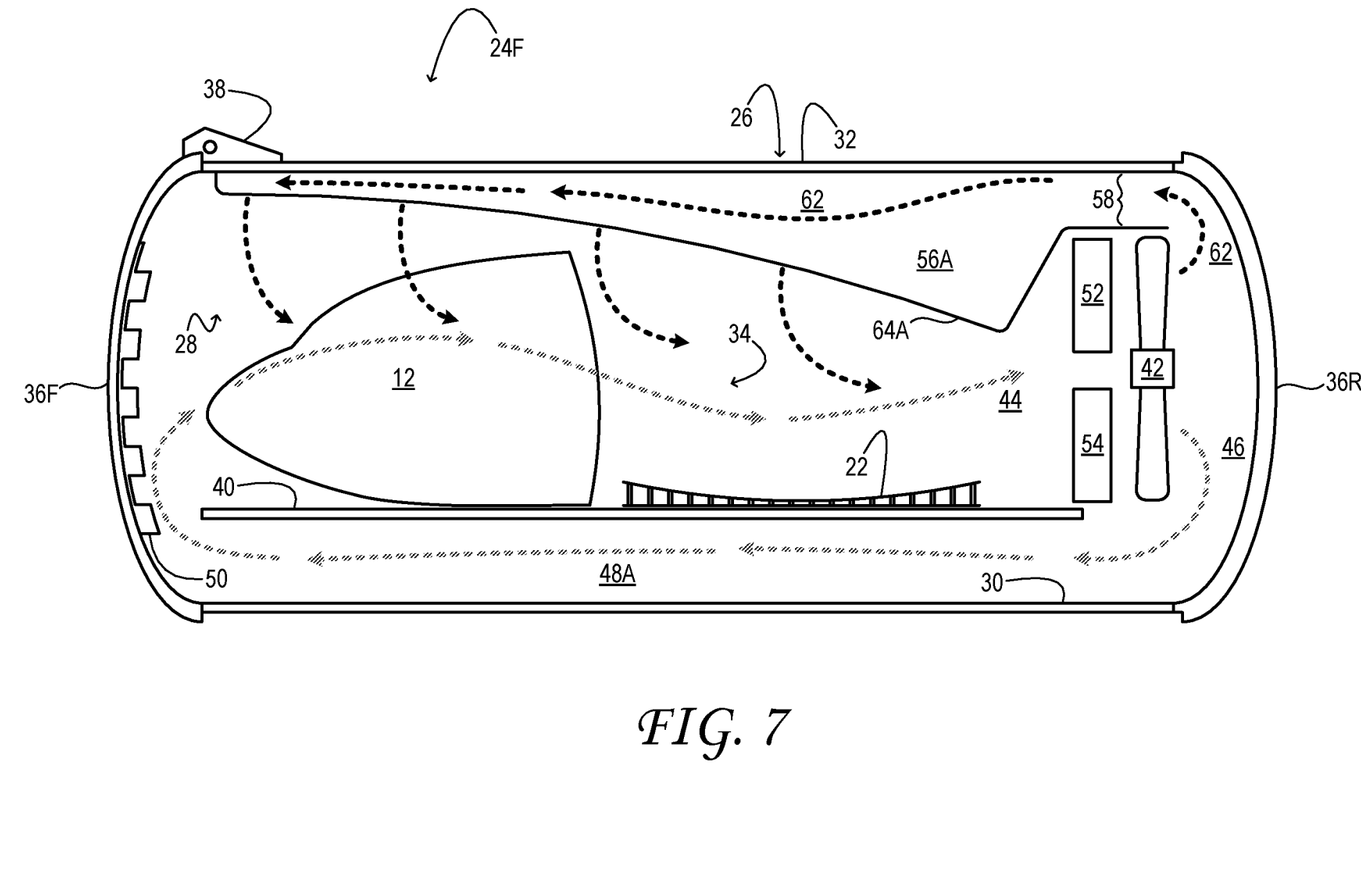

FIG. 7 shows aspects of another example autoclave 24F, in which heater 52 and cooler 54 are arranged directly upstream of impeller 42. In a related example, at least one heater and/or cooler may be arranged directly downstream of the impeller. These example configurations provide an additional advantage in that the entirety of the circulating flow may be heated and/or cooled, as opposed to only the non-plenum chamber flow 46. In still other examples, one or more heaters and/or coolers may be arranged in a plenum 56, in addition to any heater or cooler in the subfloor conduit or annulus, or as an alternative.

Figures 8A, 8B:
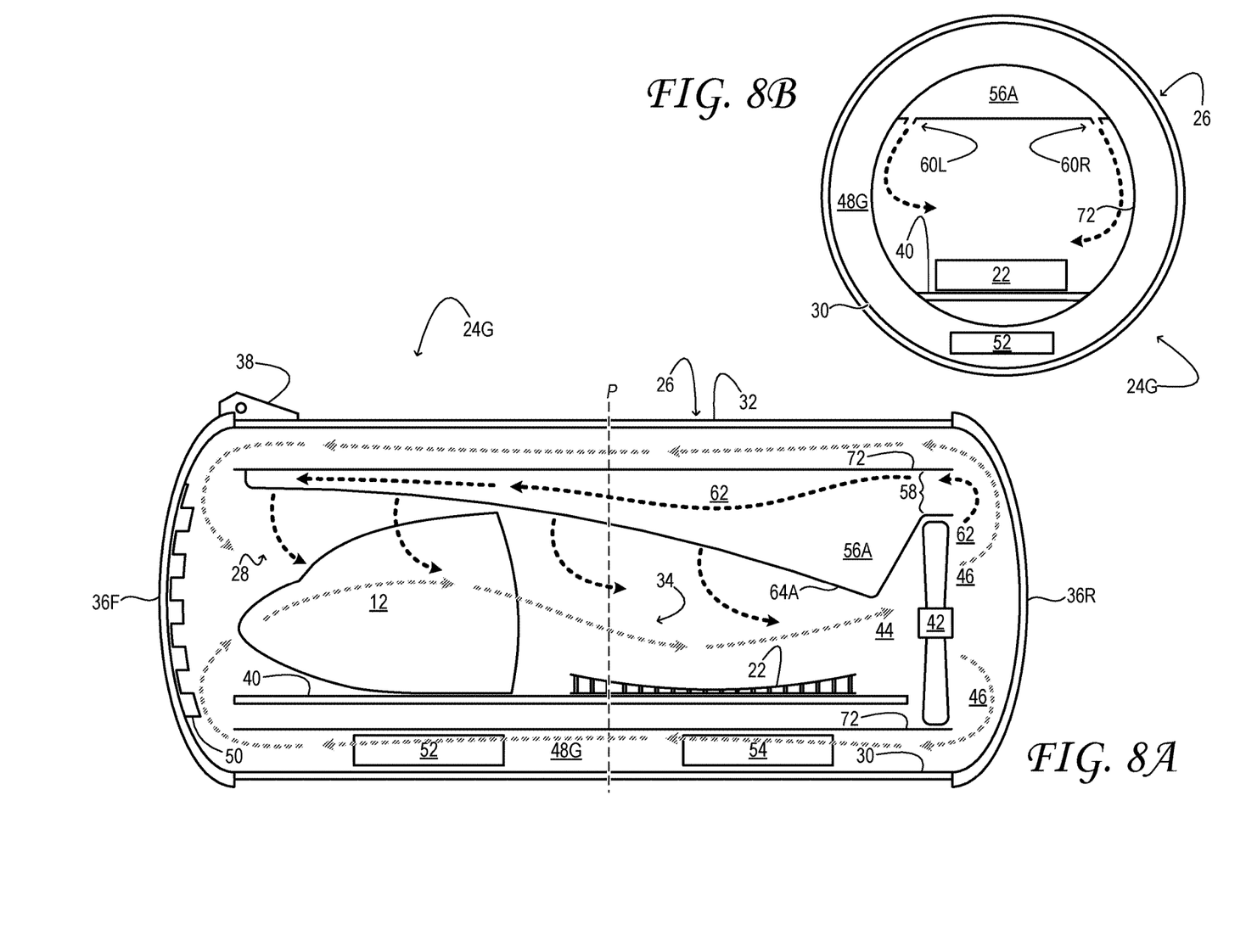

FIGS. 8A and 8B show aspects of another example autoclave 24G. Autoclave 24G includes an elongate annular partition 72 arranged in elongate chamber 26. Non-plenum chamber flow 46 is conducted through the space between the elongate annular partition and elongate interior wall 30 of the elongate chamber. More specifically, the non-plenum chamber flow is not restricted to the subfloor conduit but may flow through any portion of the annulus between the interior wall and the annular partition. In the example of FIGS. 8A and 8B, the chamber and the annular partition share a common axis, such that non-plenum conduit 48G is radially symmetric. That feature, however, is not strictly necessary. In other examples, the axis of the annular partition may be offset from the axis of the chamber in order to provide extra clearance (e.g., for heater 52 and/or cooler 54) on one side of the chamber. In autoclave 24G and related examples, plenum 56A is positioned on the annular partition as opposed to the interior wall of the autoclave. In some examples, boundary surface 64A of the plenum may be coupled directly to the annular partition.

Figure 9A:
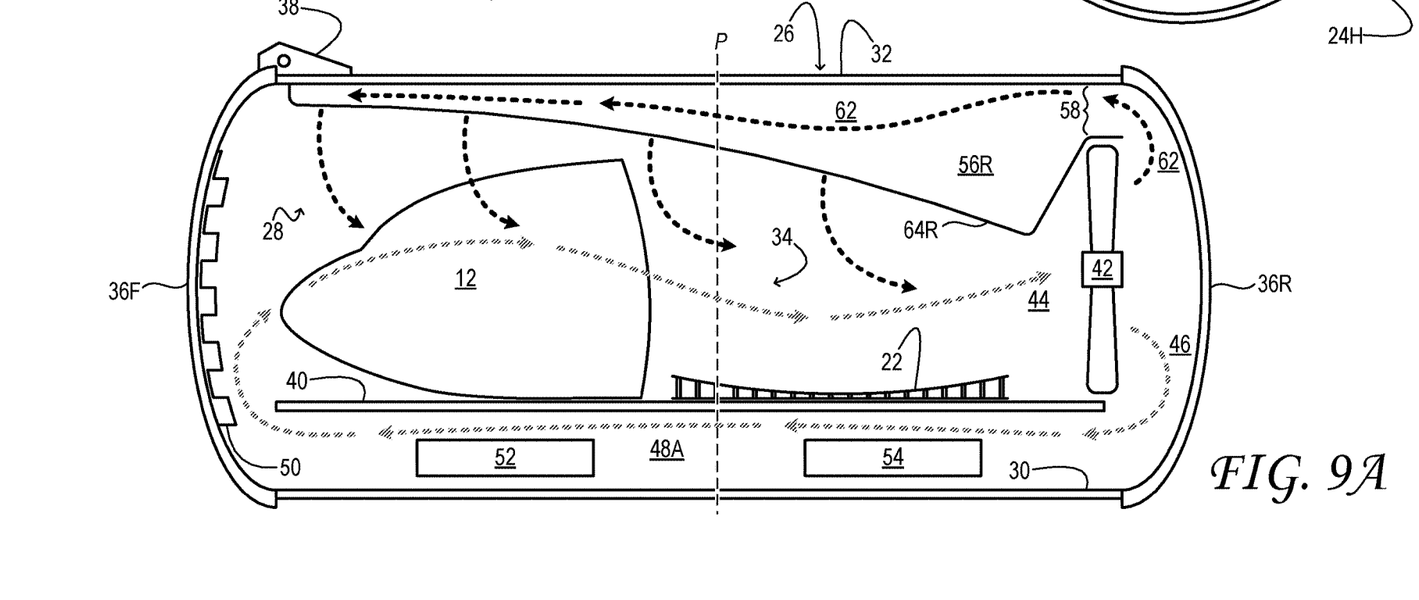
Figure 9B:
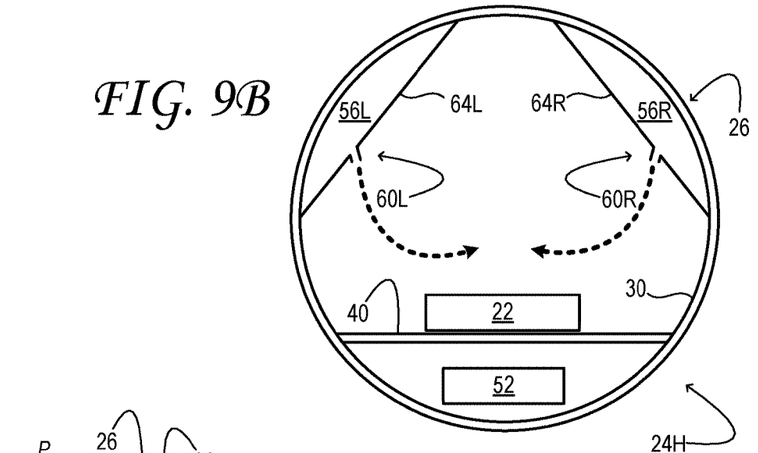

FIGS. 9A and 9B show aspects of another example autoclave 24H. Autoclave 24H includes a first plenum 56R and a second plenum 56L. The first plenum extends through the right-hand portion of elongate chamber 26, and the second plenum extends through a left-hand portion of the chamber. The first plenum includes a first inlet 58R configured to receive a first plenum flow 62R of interior atmosphere 28, as well as a first plurality of outlets 60R, each configured to release a portion of the first plenum flow to a different locus of the right-hand portion of the elongate chamber. The second plenum includes a second inlet 58L configured to receive a second plenum flow 62L of the interior atmosphere, as well as a second plurality of outlets 60L, each configured to release a portion of the second plenum flow to a different locus of the left-hand portion of the elongate chamber. More generally, an autoclave consonant with this disclosure may include any number of plena, each configured to release plenum flow to an associated portion of the chamber. In examples in which two or more plena are included in an autoclave, the detailed configuration of the plena may be the same or different. Moreover, any included plenum may be configured as described in any of the examples above—e.g., in regard to cross section, curvature of the boundary surfaces, and outlet and inlet configuration. In any included plenum, such features may also be combined and/or varied to yield plenum and autoclave configurations not specifically illustrated above.

Figure 10:
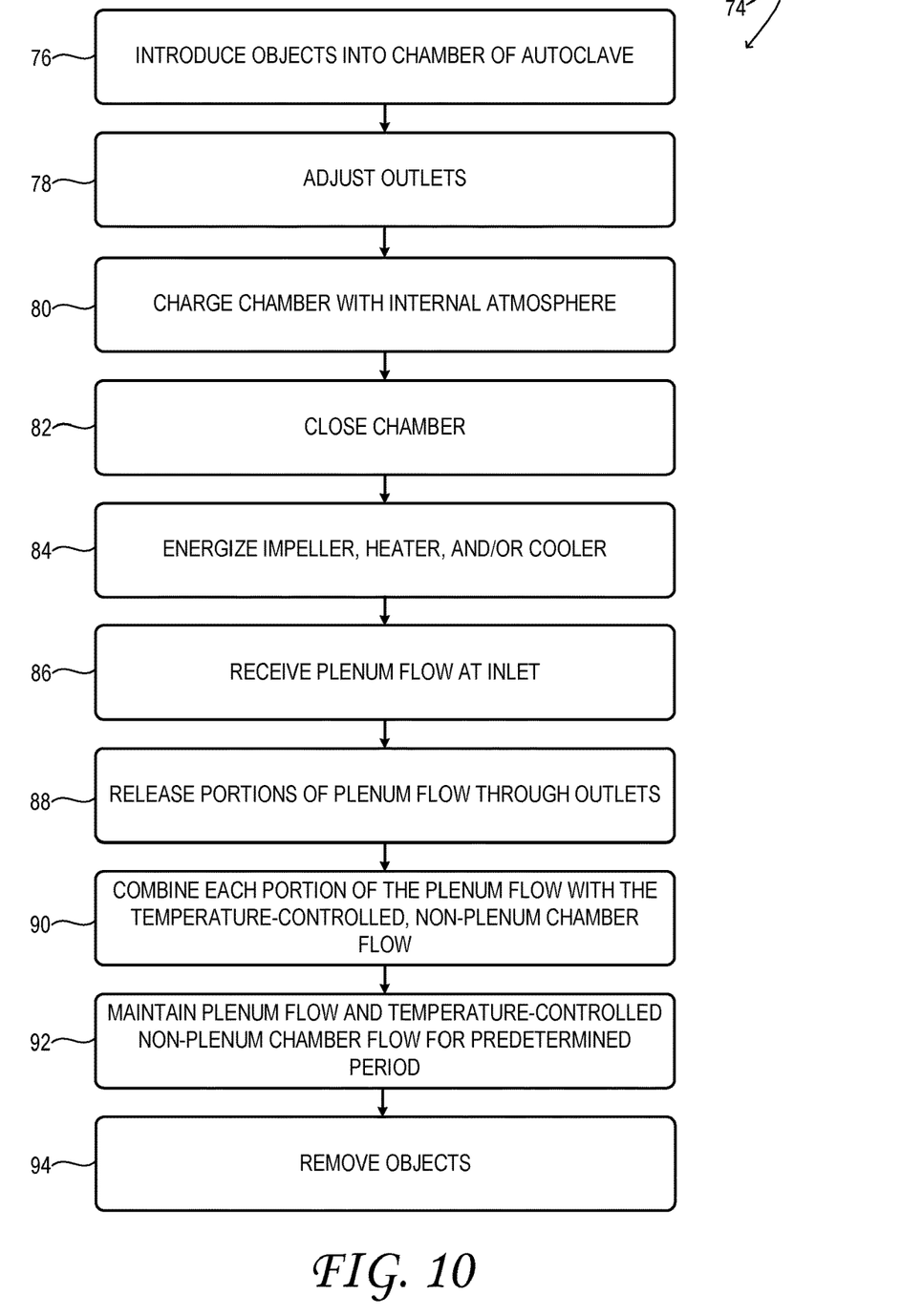
FIG. 10 shows aspects of an example method for improving heat transfer in an autoclave.

FIG. 10 illustrates an example method 74 for improving heat transfer in an autoclave. Method 74 may be employed in an overall method for processing one or articles of manufacture (e.g., 'objects 34', herein), including but not limited to fiber-composite aircraft parts. Method 74 may be enacted using any autoclave plenum, including any suitable combination of the plenum features described herein. Non-limiting example plena include plena 56A, 56B, 56R and 56L of autoclaves 28A-H as described above.

At 76 of method 74, the one or more objects are introduced into the chamber of the autoclave. At 78 one or more outlets of one or more plena of the autoclave are adjusted in size and/or orientation in dependence on the dimensions of the one or more objects and on the nature of the desired processing. The outlets may be adjusted manually or electronically, via any suitable actuator and controller. At 80 the chamber is charged with the desired internal atmosphere for processing the one or more objects. Again, the chamber may be charged manually or under the direction of an electronic controller. At 82 the chamber is closed.

At 84 one or more of a heater, a cooler, and an impeller in the autoclave are energized so as to provide a temperature-controlled non-plenum chamber flow of the internal atmosphere of the chamber. The heater and/or cooler may be controlled in a closed-loop manner, as described above. The impeller, additionally, may be subject to electronic control in some examples. In other examples, the impeller may be energized manually. At 86 of method 74, a plenum flow of the interior atmosphere of the chamber of the autoclave is received through an inlet of a plenum. At 88 a portion of the plenum flow is released from each of a plurality of outlets of the plenum, to a different locus of the chamber. At 90 each portion of the plenum flow released from the plurality of outlets is combined with the temperature-controlled, non-plenum chamber flow. At 92 the plenum flow and temperature-controlled, non-plenum chamber flow are maintained for a predetermined period of time. As noted hereinabove, the plenum, in some examples, may be configured such that the various release flows 63A, 63B, etc. (referring again to FIG. 2A, as a non-limiting example) combine to form a rotating current in the interior atmosphere of the autoclave chamber. This action may enhance heat transfer to the objects within the autoclave, for more uniform curing of fiber-composite structures and other advantages. A significant advantage of the released plenum flow, generally, and rotating combined flow, specifically, may be gained in relatively large autoclaves—e.g., those suitable for accommodating aircraft parts. At 94 the autoclave is opened, and the one or more objects are removed.

No aspect of the foregoing drawings or description should be interpreted in a limiting sense, because numerous variations, extensions, and omissions are also envisaged. For instance, while plena 56 and subfloor conduits 48 are configured to carry distinct different flows in the examples above, the subfloor conduit itself may serve as a plenum in still other examples. In other words, the size of the subfloor conduit and the position and configuration of floor 40 may be engineered to provide robust air flow around the objects 34 in the autoclave chamber. In one example, a series of outlets 60 may be located along the centerline of the floor to bring a vertical plume of air directly against the underside of the objects.

It will be noted that various example autoclaves and plena are described and illustrated herein. However, various additional autoclaves and plena having combinations or sub-combinations of features derived from the examples are equally contemplated.

Furthermore, although autoclaves having integrated plena are emphasized above, this disclosure also embraces a plenum kit that may be provided for the purpose of retrofitting an existing autoclave to improve heat-transfer efficiency therein. In some examples, different plena varying in size and/or shape may be installed in the same autoclave, depending on the dimensions of the objects to be processed therein. In such examples, an existing plenum may be exchanged for a different compatible plenum, as appropriate, to process objects of different dimensions. A plenum kit may include one or more boundary surfaces 64 of one or more plena 56 and instructions for mounting the boundary surfaces in an autoclave of a specified configuration. In some examples, a system of rails and brackets may be used to attach the boundary surfaces of a plenum to the chamber of an autoclave.

Figure 11:
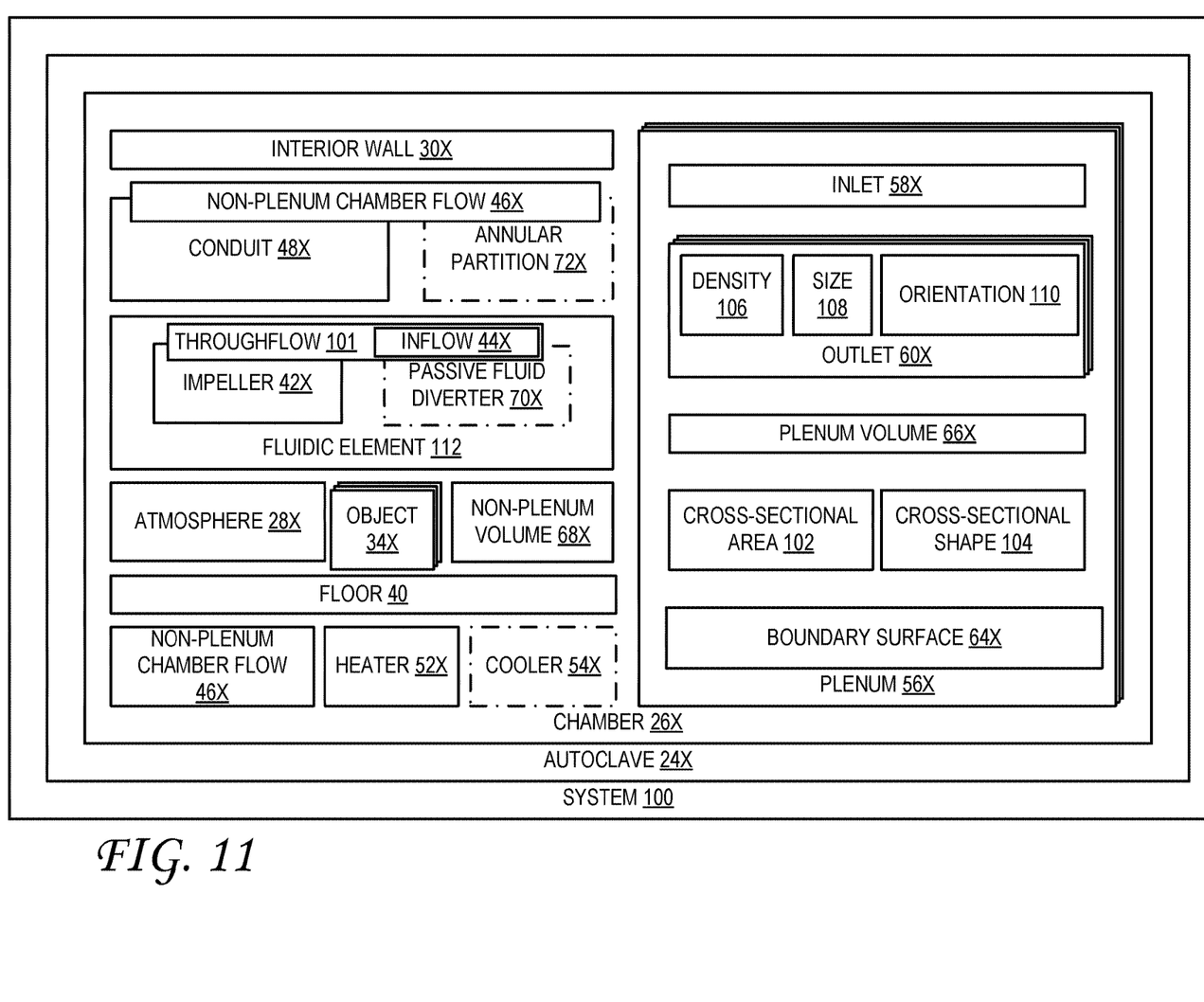
FIG. 11 shows aspects of an example autoclave in block form.

Selected aspects of this disclosure will now be further summarized with reference to the process flow of FIG. 10 and to the block diagram of FIG. 11.

Referring first to FIG. 11, one aspect of this disclosure is directed to a system 100 comprising a plenum 56X extending through a portion of a chamber 26X of an autoclave 24X, wherein the chamber encloses an interior atmosphere 28X. Example plena 56X include (referring again to the previous drawings) plena 56A, 56B, 56R and 56L of autoclaves 28A-H, or any suitable plenum. In the numbering convention used in FIG. 11, chamber 26X, for example, may include chamber 26 of the description above or any other suitable chamber. The plenum includes an inlet 58X configured to receive a plenum flow 62X of the interior atmosphere. The plenum includes a plurality of outlets 60X, each of the plurality of outlets being configured to release a portion of the plenum flow to a different locus of the chamber.

In some implementations, at least one of the plurality of outlets 60X is configured to release a corresponding portion of the plenum flow 62X into a rotating current in the interior atmosphere 28X. In some implementations, inlet 58X is configured to receive the plenum flow from an impeller 42X arranged in the chamber. Here, plenum flow 62X may be separated from an impelled, fluidic throughflow 101 of the impeller. In some implementations, the inlet is configured to receive the plenum flow from a passive fluid diverter 70X arranged in chamber 26X. Here, the plenum flow is separated from a fluidic throughflow of the passive fluid diverter. In some implementations, chamber 26X is an elongate chamber, and the plurality of outlets 60X are distributed along a length of the chamber. In some implementations, a cross-sectional area 102 of the plenum varies along the length of the chamber. In some implementations, a cross-sectional shape 104 of the plenum varies along the length of the chamber. In some implementations, a boundary surface 64X of the plenum is curved along the length of the chamber, the boundary surface separating a plenum volume 66X from non-plenum chamber volume 68X. In some implementations, the plurality of outlets 60X are distributed at varying density 106 on the plenum. In some implementations, the plurality of outlets have variable size 108. In some implementations, the plurality of outlets have variable orientation 110.

Another aspect of this disclosure is directed to an autoclave 28X comprising an elongate chamber 26X enclosing an interior atmosphere 28X, a floor 40X, and a plenum 56X. The floor is arranged in the chamber and configured to support one or more objects 34X. The plenum extends through a portion of the elongate chamber. The plenum includes an inlet 58X and a plurality of outlets 60X. The inlet is configured to receive a plenum flow 62X of the interior atmosphere. Each of the plurality of outlets is configured to release a portion of the plenum flow to a different locus of the elongate chamber.

In some implementations, autoclave 24X further comprises a fluidic element 112 arranged in the elongate chamber, the fluidic element being configured to receive an inflow 44X from downstream of the one or more objects 34X and to separate the inflow into plenum flow 62X and non-plenum chamber flow 46X. In some implementations, the fluidic element includes one or both of an impeller 42X and a passive fluid diverter 70X. In some implementations, the autoclave further comprises one or both of a heater 52X and a cooler 54X configured to control a temperature of the non-plenum chamber flow. In some implementations, the autoclave further comprises a conduit 48X arranged below floor 40X, where the non-plenum chamber flow is conducted through the conduit. In some implementations, the autoclave further comprises an elongate annular partition 72X arranged in the elongate chamber, where the non-plenum chamber flow is conducted between the elongate annular partition and an elongate interior wall 30X of the elongate chamber. In some implementations, plenum 56X is a first plenum, and the autoclave further comprises a second plenum extending through a different portion of the elongate chamber Here, the second plenum includes a second inlet 58X and a second plurality of outlets 60X. The second inlet is configured to receive a second plenum flow 62X of the interior atmosphere. Each of the second plurality of outlets is configured to release a portion of the second plenum flow to a different locus of the elongate chamber.

Returning again to FIG. 10, another aspect of this disclosure is directed to a method 74 for improving heat transfer in an autoclave, the method comprising receiving, at 86, a plenum flow of an interior atmosphere of a chamber of the autoclave through an inlet of a plenum; and releasing, at 88, a portion of the plenum flow from each of a plurality of outlets of the plenum to a different locus of the chamber.

In some implementations, each portion of the plenum flow released from the plurality of outlets is combined with a temperature-controlled, non-plenum chamber flow.

It will be understood that the configurations and/or approaches described herein are exemplary in nature, and that these specific embodiments or examples are not to be construed in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various configurations, properties, functions, processes, acts, and other features disclosed herein, as well as any and all equivalents thereof.

The invention claimed is:

1. An autoclave comprising:
   an elongate chamber enclosing an interior atmosphere;
   a fluidic element arranged at one end of the elongate chamber and configured to receive an inflow of the interior atmosphere and to separate the inflow into a plenum flow and a non-plenum chamber flow;
   a conduit configured to receive the non-plenum chamber flow at the one end of the elongate chamber and to conduct the non-plenum chamber flow to an opposite end of the elongate chamber, the conduit having invariant cross section orthogonal to a longitudinal axis of the elongate chamber; and
   a plenum configured to receive the plenum flow through an inlet and to release the plenum flow through a plurality of outlets, wherein a cross section of the plenum orthogonal to the longitudinal axis decreases continuously in an area over which the plenum flow is released.

2. The autoclave of claim 1, wherein at least one of the plurality of outlets is configured to release a corresponding portion of the plenum flow into a rotating current in the interior atmosphere.

3. The autoclave of claim 1, wherein the inlet is configured to receive the plenum flow from an impeller arranged in the elongate chamber, and wherein the plenum flow is separated from a fluidic throughflow of the impeller.

4. The autoclave of claim 1, wherein the inlet is configured to receive the plenum flow from a passive fluid diverter arranged in the elongate chamber, and wherein the plenum flow is separated from a fluidic throughflow of the passive fluid diverter.

5. The autoclave of claim 1, wherein a cross-sectional shape of the plenum varies along a length of the elongate chamber.

6. The autoclave of claim 1, wherein a boundary surface of the plenum is curved along a length of the elongate chamber, and wherein the boundary surface separates a plenum volume from a non-plenum chamber volume.

7. The autoclave of claim 1, wherein the plurality of outlets are distributed at varying density on the plenum.

8. The autoclave of claim 1, wherein the plurality of outlets have variable size.

9. The autoclave claim 1, wherein the plurality of outlets have variable orientation.

10. An autoclave comprising:
   an elongate chamber enclosing an interior atmosphere;
   a fluidic element arranged at one end of the elongate chamber and configured to receive an inflow of the interior atmosphere and to separate the inflow into a plenum flow and a non-plenum chamber flow;
   a floor arranged in the elongate chamber and configured to support one or more objects, wherein the non-plenum chamber flow is conducted below the floor, through a conduit; and
   extending through a portion of the elongate chamber, a plenum configured to receive the plenum flow through an inlet and to release the plenum flow through a plurality of outlets, wherein a cross section of the plenum orthogonal to a longitudinal axis of the elongate chamber decreases continuously in an area over which the plenum flow is released,
   wherein
   each of the plurality of outlets is configured to release a portion of the plenum flow to a different locus of the elongate chamber.

11. The autoclave of claim 10, wherein the fluidic element is configured to receive an inflow from downstream of the one or more objects.

12. The autoclave of claim 11 wherein the fluidic element includes a passive fluid diverter.

13. The autoclave of claim 11, further comprising one or both of a heater and a cooler configured to control a temperature of the non-plenum chamber flow.

14. The autoclave of claim 11, further comprising an elongate annular partition arranged in the elongate chamber, wherein the non-plenum chamber flow is conducted between the elongate annular partition and an elongate interior wall of the elongate chamber.

15. The autoclave of claim 10, wherein the plenum is a first plenum, and wherein the autoclave further comprises a second plenum extending through a different portion of the elongate chamber, wherein the second plenum includes a second inlet configured to receive a second plenum flow of the interior atmosphere, and wherein the second plenum includes a second plurality of outlets, each of the second plurality of outlets configured to release a portion of the second plenum flow to a different locus of the elongate chamber.

16. A method for improving heat transfer in an autoclave having an elongate chamber, the method comprising:
   receiving an inflow of an interior atmosphere from downstream of a plurality of objects in the autoclave and separating the inflow into a plenum flow and a non-plenum chamber flow via a fluidic element arranged at one end of the elongate chamber;
   receiving the non-plenum chamber flow at the one end of the elongate chamber and conducting the non-plenum chamber flow to an opposite end of the elongate chamber through a subfloor conduit;
   receiving the plenum flow into an inlet of a plenum configured to release the plenum flow through a plurality of outlets, wherein a cross section of the plenum orthogonal to a longitudinal axis of the elongate chamber decreases continuously in an area over which the plenum flow is released, the plenum including a closed end opposite the inlet,
   wherein a portion of the plenum flow is released from each of the plurality of outlets of the plenum to a different locus of the elongate chamber.

17. The method of claim 16, wherein each portion of the plenum flow released from the plurality of outlets is combined with the non-plenum chamber flow, and wherein the non-plenum chamber flow is temperature-controlled.

18. The autoclave of claim 10, wherein the one end of the elongate chamber is a first end, the autoclave further comprising a fluid diffuser arranged at an end of the elongate chamber opposite the first end.

19. The autoclave of claim 13, wherein the one or both of the heater and the cooler are arranged in the conduit.

20. The method of claim 16, further comprising providing the plenum as a retrofit to the autoclave.

* * * * *